United States Patent [19]
Frisken

[11] Patent Number: 6,014,475
[45] Date of Patent: Jan. 11, 2000

[54] FIBER OPTIC CIRCULATOR

[75] Inventor: Steven James Frisken, Maroubra, Australia

[73] Assignee: Australian Technology Park Photonic Technologies Pty. Ltd., Eveleigh, Australia

[21] Appl. No.: 08/942,601

[22] Filed: Oct. 2, 1997

Related U.S. Application Data

[63] Continuation of application No. PCT/AU96/00800, Dec. 13, 1996.

[30] Foreign Application Priority Data

Dec. 14, 1995 [AU] Australia .............................. PN 7142

[51] Int. Cl.$^7$ ....................................................... G02B 5/30
[52] U.S. Cl. ................................ 385/11; 385/33; 385/27; 359/281
[58] Field of Search .................................. 385/14, 15, 17, 385/24, 18, 47, 11, 33, 27; 359/115, 124, 127, 132, 281, 485, 494, 495, 497, 282

[56] References Cited

U.S. PATENT DOCUMENTS

| | | | |
|---|---|---|---|
| 4,375,910 | 3/1983 | Seki ......................................... | 350/375 |
| 4,978,189 | 12/1990 | Blonder et al. ....................... | 350/96.12 |
| 5,105,307 | 4/1992 | Nishiyama et al. .................... | 359/484 |
| 5,204,771 | 4/1993 | Koga ....................................... | 359/281 |
| 5,267,078 | 11/1993 | Shiraishi et al. ........................ | 359/282 |
| 5,428,477 | 6/1995 | Siroki ..................................... | 359/484 |
| 5,471,340 | 11/1995 | Cheng et al. ........................... | 359/281 |
| 5,499,307 | 3/1996 | Iwatsuka ................................. | 385/11 |
| 5,574,596 | 11/1996 | Cheng ..................................... | 359/484 |
| 5,588,078 | 12/1996 | Cheng et al. ............................ | 385/33 |
| 5,652,814 | 7/1997 | Pan et al. ................................. | 385/24 |
| 5,689,359 | 11/1997 | Kurata et al. ........................... | 359/281 |
| 5,734,762 | 3/1998 | Ho et al. ................................. | 385/11 |

FOREIGN PATENT DOCUMENTS

| | | |
|---|---|---|
| 421654 | 4/1991 | European Pat. Off. . |
| 491607 | 6/1992 | European Pat. Off. . |
| 5828561 | 2/1983 | Japan . |
| 4116616 | 4/1992 | Japan . |
| 0365907 | 10/1992 | Japan . |
| 5313094 | 11/1993 | Japan . |
| 0743640 | 2/1995 | Japan . |
| 7175020 | 7/1995 | Japan . |
| 9320146 | 10/1993 | WIPO . |
| 9409400 | 4/1994 | WIPO . |
| 9570988 | 7/1995 | WIPO . |

OTHER PUBLICATIONS

Polarization–independent optical circulator: an experiment by Matsumoto and Sato, Applied Optica, vol. 19, No. 1, Jan. 1980.
English abstract of JP 4–116616 of Apr. 1992.
English abstract of JP 07–43640 of Feb. 1995.
English abstract of JP 7–175020 of Jul. 1995.
English abstract of JP 3–65907 of Oct. 1992.
English abstract of JP 5–313094 of Nov. 1993.

*Primary Examiner*—Rodney Bovernick
*Assistant Examiner*—Ellen E. Kang
*Attorney, Agent, or Firm*—Ladas & Parry

[57] ABSTRACT

A non reciprocal optical device for transmitting light in a forward and reverse direction substantially independently of polarization state from a collection of waveguides. The device includes: a first array of spaced apart waveguides having at least a first wave guide and a second waveguide; a second array of spaced apart waveguides including at least a third waveguide; an imaging component for focusing a diverging beam of light disposed between the first array and the second array of waveguides, at least two polarization equalization components for polarization equalization of diverging or converging light, each of the polarization equalization components disposed between a waveguide array and the imaging component; add a plurality of polarization rotation components disposed between each waveguide array. Light from the first waveguide is transmitted to the third waveguide and light from the third waveguide is transmitted to the second waveguide in a polarization independent manner. The polarization equalization components and the imaging component are disposed with respect to one another and with respect to the respective first, second and third waveguides such that light radiating from each of the first, second and third waveguides first passes through one of the at least two polarization equalization components prior to passing through the imaging component which is located between the polarization equalization components.

26 Claims, 9 Drawing Sheets

FIBER OPTIC CIRCULATOR

This application is a continuation of copending application International Application PCT/AU96/00800 filed on Dec. 13, 1996 and which designated the U.S.

TECHNICAL FIELD

The present invention relates to the field of optical systems, and particularly fiber optic systems and single mode transmission systems operating in the infra red. The invention has particular relevance to non reciprocal optical devices for routing of light.

BACKGROUND ART

An optical circulator is a non reciprocal device allowing for the routing of light from one fiber to another based upon the direction of the light propagation. A three port circulator outputs to a second port, light received on a first port and outputs to a third port, light which is input on the second port. The number of ports can be increased arbitrary, and it is possible to have fully circulating devices and quasi-circulating devices where the light from the last port does not return to the first port.

There have been a number of configurations proposed for optical circulators to achieve substantial polarization independence. In particular a circulator can be based on polarization beam spitters (either via walk off crystals or polarization beam splitters) Faraday rotation elements and a combination of optically active elements or birefringent retardation plates. In FIG. 1 an example of prior art is shown, where substantially collimated beams are formed by lenses 101,112,208 and 111. A pair of beam splitting prisms 102 and 107 divide or recombine the light according to the polarization slate. Non reciprocal polarization rotators 103 and 104, and reciprocal rotators 105 and 106 and mirrors 110 and 109 allow polarization independent routing of the light from the lens 101 to the lens 107. Light incident on the lens 107, proceeding from the fiber, is routed to the lens 112 and light incident on 112 is routed to the lens 111. In each case the light can be captured by the optical fiber positioned at the focus. Full description can be found in T. Matsumoto et al. "Polarization-independent optical circulator: an experiment." Appl. Opt. Vol. 19, No. 1 pp. 108–112, 1960. This prior art does not exhibit high isolation and is complicated due to the difficulty of producing and aligning the prisms involved.

It has been shown in the prior art that an isolator can be constructed by appropriate positioning of thin birefringent double refraction crystals in a converging beam as shown in FIG. 2. In this optical isolator, light travelling from left to right as indicated by the upper thick arrow is incident in the fiber 201 and is focused by a lens 202, passing through a flat double refraction crystal 203. The double refraction crystal provides a polarization dependent displacement. Both polarization states pass through a Faraday rotation crystal 204 producing a clockwise rotation of approximately 45 degrees. A crystal 205 provides a reciprocal rotation of the light. A second double refraction crystal 206 allows a second polarization dependent displacement and the images coalesce at the fiber 207. It is necessary to use very thin double refraction crystals, 203 and 206, typically less than 0.5 mm to ensure that low loss is achieved when using single mode fiber to ensure that beam distortion of the extraordinary ray is minimized.

Light travelling from right to left as indicated by the lower thick arrow proceeds from optical fiber 207 to optical fiber 201 is rotated counter clockwise relative to the proceeding direction by the Faraday rotator. Therefore the polarization centers of the ordinary and extraordinary beams neither coincide nor enter the optical fiber. This isolator is detailed in Patent Publication No. Sho-58-28561. This technique has not been able to be used to produce a circulator because the return paths don't coalesce for the different polarization states, and significant distortion would be introduced to the beam if a displacement comparable to a fiber width (125 micron) were to be achieved to allow the capture by a third fiber.

It is also possible to provide a circulator based only on polarization walk-off plates and Faraday rotation elements. In each case the separation and recombination of polarization is achieved by passing a substantially collimated beam through a polarization selective element. This form of polarization splitting is shown in FIG. 3. Light proceeding from fiber 301 is collimated by a lens 302 and one polarization state is displaced relative to a second polarization state by a doubly birefringent crystal 303 by an amount exceeding the beam width. Each of the beams can be focused with separate lenses 304 and 305 into fibers 306 and 307 respectively. Details of an implementation utilizing this principle for achieving the functionality of an optical circulator are described in Patent Publication 0 491 607 A2. The major deficiency of this implementation is the very long optical path lengths necessitated, Optical circulators which are based upon the use of walkoff plates (birefringent plates which laterally displace one polarization state relative to the other polarization state require long lengths of birefringent crystal to achieve a suitable walk off to allow the return light to be captured in a different beam. As such the devices can be bulky and difficult to ensure environmental insensitivity. In addition the large optical distances which the beam has to travel mean that the coupling losses can increase.

Another class of circulators employs a non reciprocal phase shift in an interferometric arrangement (Mach Zehnder). It is not however able to achieve very high isolation of the return light (typically 30 dB) Such an implementation is described in PCT Patent Application PCTAU9300146.

Another class of nonreciprocal devices has used expansion of the core size of a fiber to allow light to travel a significant distance through a walkoff plate or polariser and Faraday rotator element without incurring large coupling losses due to the diffraction effects of light. A polarization independent isolator has been constructed using this technique, although losses are still too high for many applications. The return light of this device is however lost into the cladding of the fiber and not able to be separately routed. Although it could in principle be possible to produce a circulator using this technique, the extra length and complexity that would be involved would make it very difficult to achieve low losses.

It is desired to provide a device for achieving substantially nonreciprocal routing of light which at least partly overcomes the deficiencies of the prior art.

SUMMARY OF INVENTION

In accordance with one aspect of the present invention there is provided an optical circulator comprising; optical waveguides, means for spatial displacement of one polarization state relative to the second; at least one Faraday rotation element; a plurality of elements to displace the image of the fiber for given polarization states; and a means of imaging the light from the first set of waveguides to a second set of optical waveguides.

Preferably the first set of waveguides and the second set of waveguides are collinear. The waveguides can be disposed either on opposite sides of the imaging means or on the same side, where reflection of the beam is used to double pass elements of the circulator.

Preferably the waveguides have the mode field expanded adiabatically to give a reduced divergence of the light proceeding from the waveguides to permit separation of the polarization states and reduced distortion of the beam propagating through the double refraction crystals. Such expansion of waveguide is preferably achieved through thermally expanding the core of the waveguide in a region near the fiber end.

A double refraction plate splits the light which radiates from the first waveguide in to two polarization states. It is possible to place an optical element to rotate by 90° in a reciprocal fashion the polarization state of one of the polarization states. All of the light from the initial waveguide is now in the same polarization state irrespective of the initial input polarization. A similar configuration is provided at the second waveguide, though it may be necessary to split or combine the polarizations in a different fashion, depending on the means used to provide non reciprocal translation of image, Because the two images are in the same polarization state it is possible to non reciprocally displace the image by the use of double refraction crystals and Faraday rotation elements. Because the double refraction crystals are not required to walk off a collimated beam, but only to displace a very small image, only a small thickness of walk off plate is required.

Alternatively, according to a second aspect of the invention, the non reciprocal displacement required can be achieve by the use of a birefringent wedge arrangement within the focusing mean to produce a polarization dependent deflection of the beam. The beam deflection becomes an image translation upon focusing. A Faraday rotator which is used can be either within the focusing means or external to the focusing means. To achieve extra isolation and functionality it is also possible to walk off the entire beam as well, though this requires a longer length of birefringent walk off crystal. Such an arrangement may simplify provision of additional ports.

The use of the double refraction plate in the divergent beam emitted from the optical fiber and also when focusing back into the fiber allows a different class of devices to be considered based on a translation of the image point as opposed to translation of the entire expanded beam. This can reduce the complexity of devices by reducing the number of lenses and reduce the losses involved. It may be advantageous to expand the core of the fiber in some cases to avoid distortion of the light when traveling through the birefringent crystal or to allow sufficient separation of the two polarization states.

By using the double refraction plate polarization splitters external to the focusing means, instead of within the collimated beam, only relatively small walk off distances are required to achieve good isolation and also to allow coupling in the reverse path into an adjacent waveguide. Largely polarization mode dispersion free operation can be achieved, with low loss and low polarization dependent loss.

BRIEF DESCRIPTION OF DRAWINGS

Preferred embodiments of the present invention are hereinafter described, by way of example only, with reference to the accompanying drawings, wherein.

DETAILED DESCRIPTION

Figure 1:
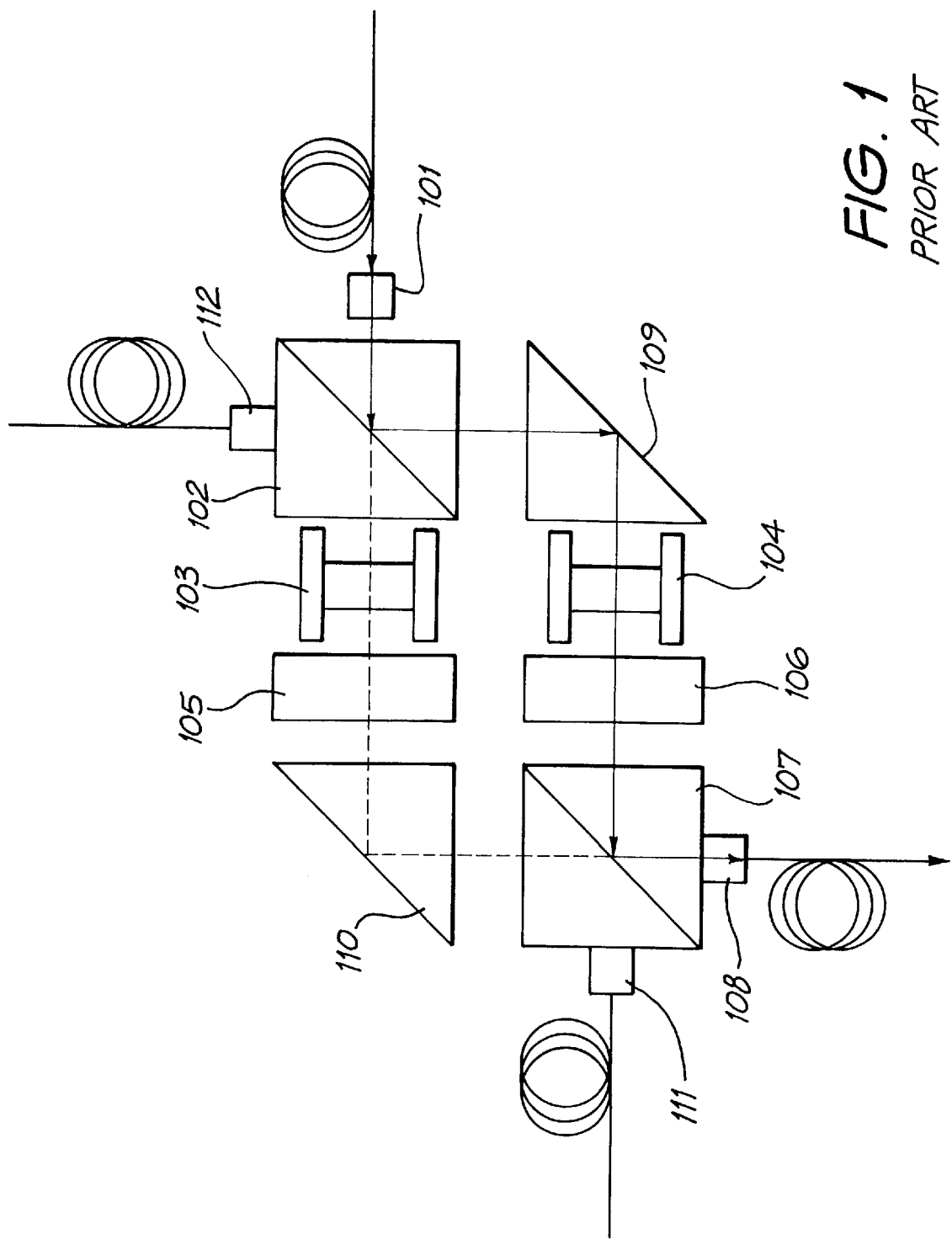
FIG. 1 shows a conventional optical circulator using polarization beam splitting prisms.
Figure 2:
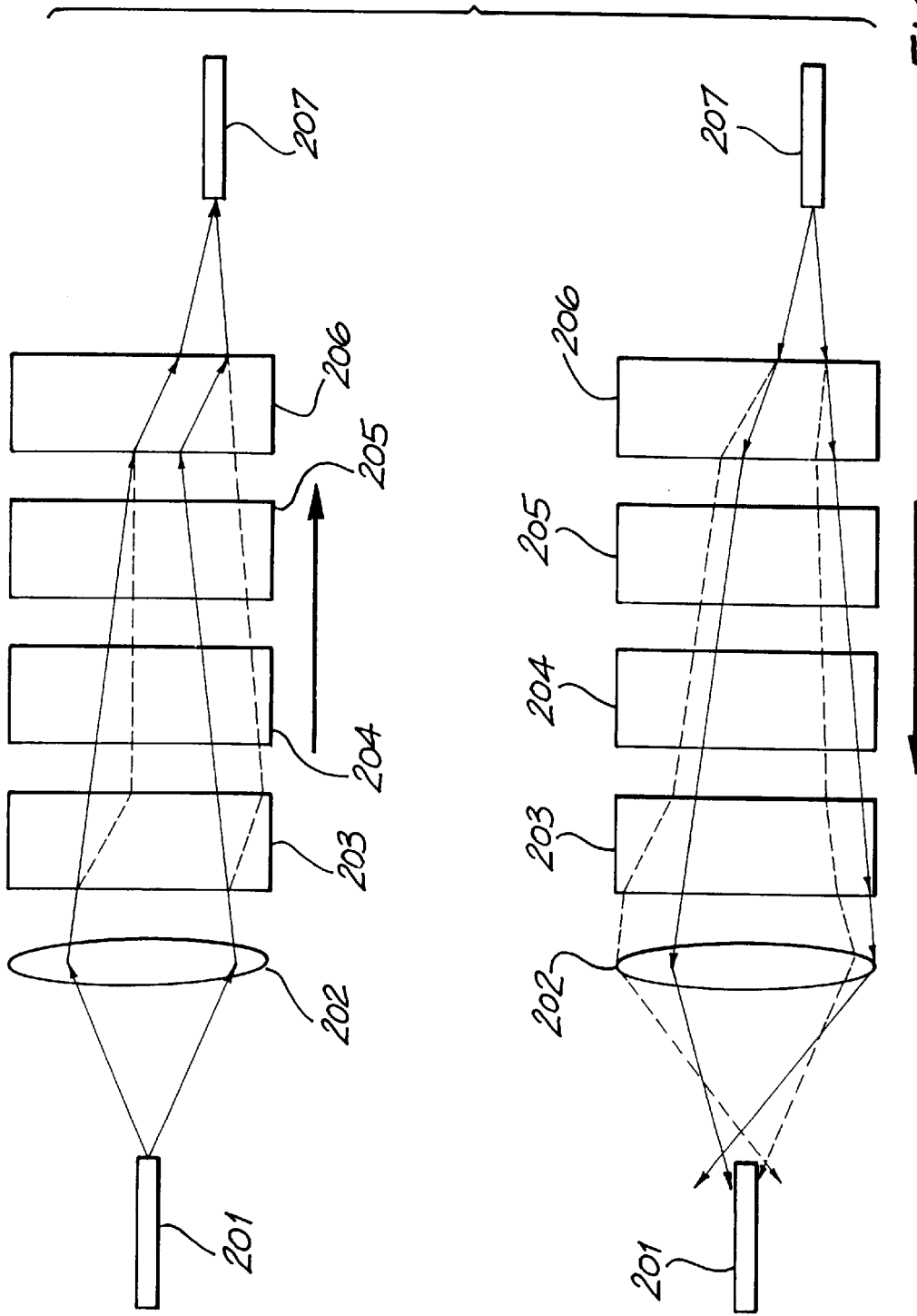
FIG. 2 shows the use of double refraction crystals in a focusing beam in prior art to produce an optical isolator.
Figure 3:
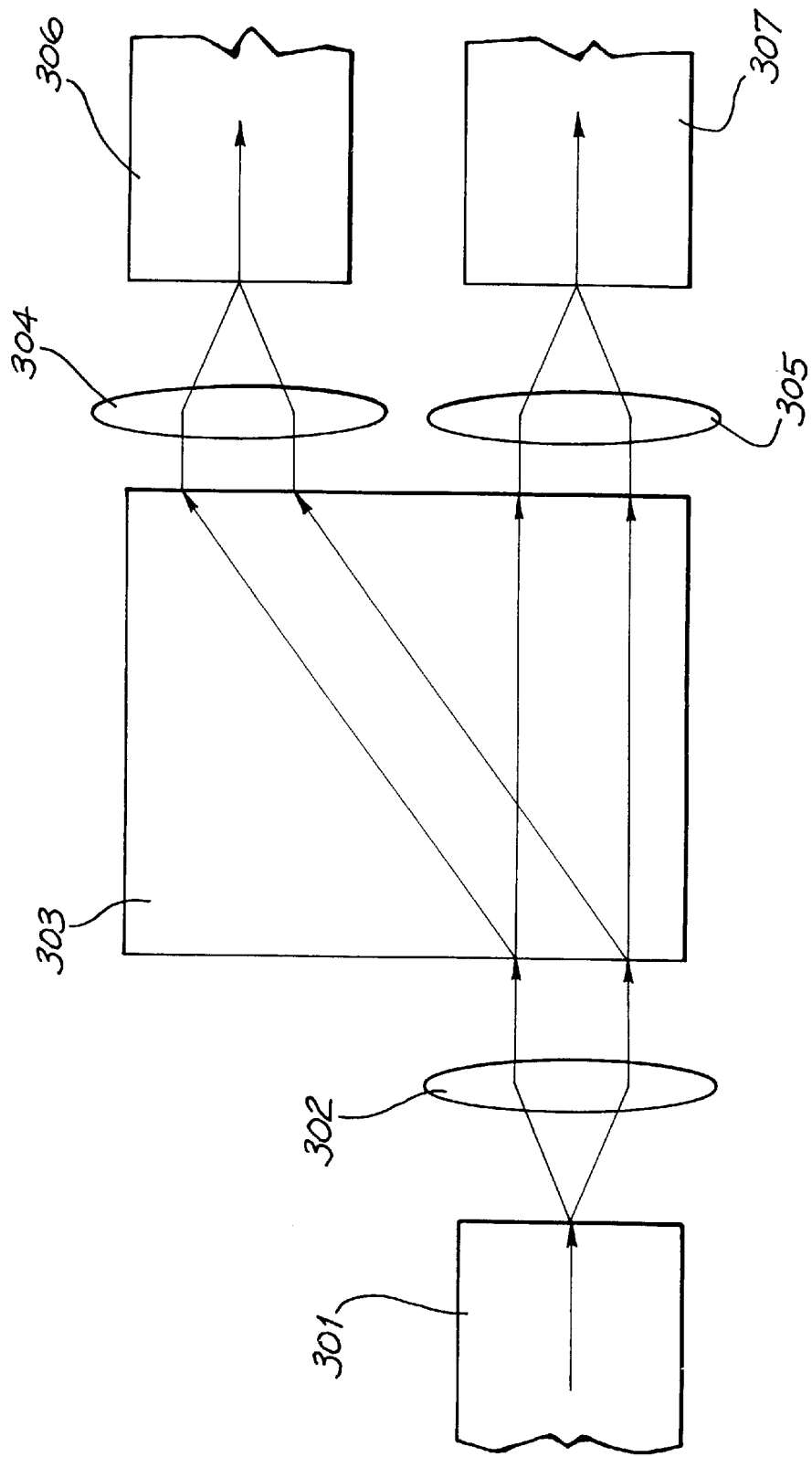
FIG. 3 shows how a double refraction crystal plate is used in prior art to split the incoming beam into two polarized beams.
Figure 4:
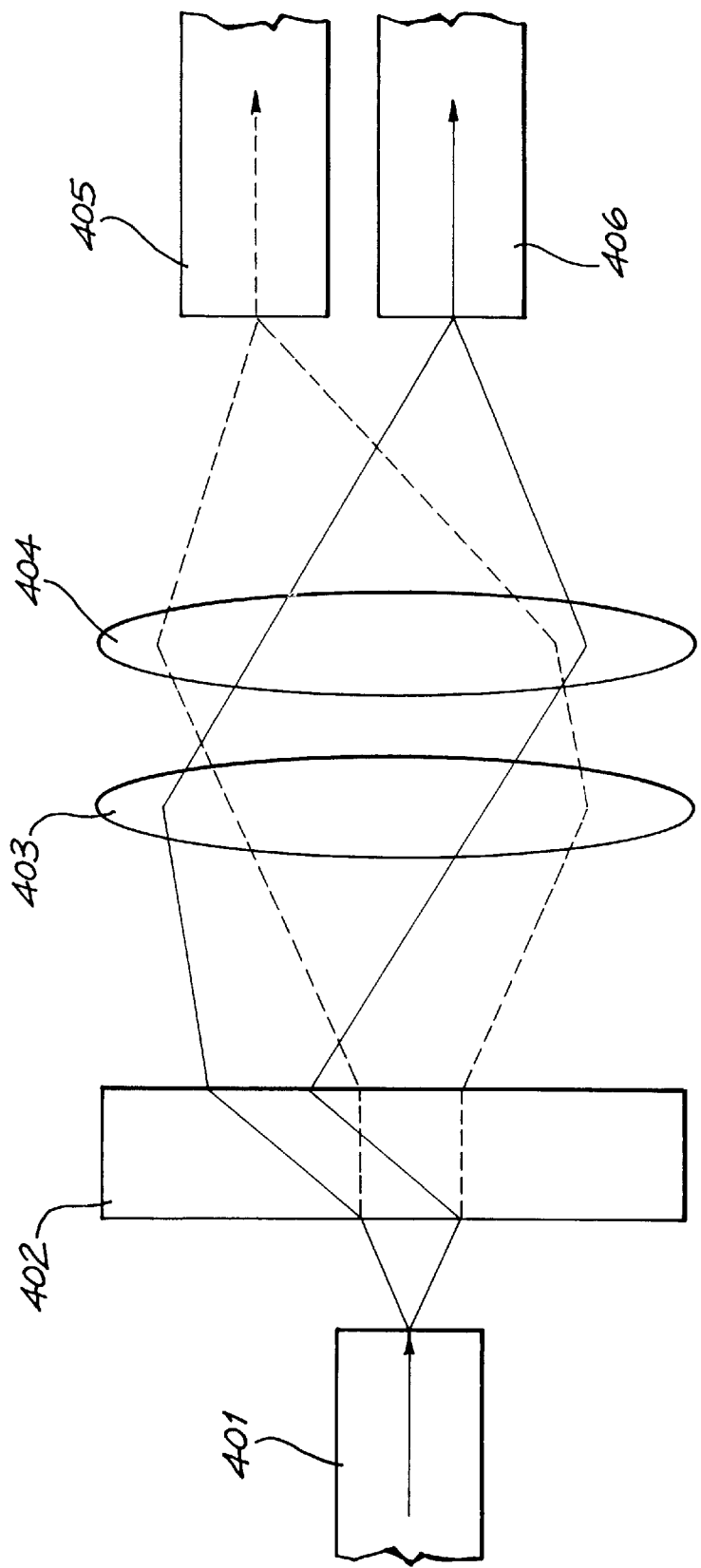
FIG. 4 shows how a shorter double refraction crystal plate is used in the present invention to provide two images.

FIGS. 3 and 4 illustrate the difference in imaging which is fundamental to the operation of the present invention. In FIG. 3, illustrating a simplified view of the prior art, it is shown how light proceeding from a waveguide 301 is collimated by an imaging means 302 to produce a substantially collimated beam. Double refraction by the crystal 303 displaces the extraordinary beam which is able to be focused by the imaging means 304 to be captured by the waveguide 306. The ordinary beam is focused by the imaging means 305 and captured by the waveguide 307. In order to separate the beams by about 1 mm corresponding to the thickness of a GRIN lens a length of crystal of about 1 cm of rutile or calcite is required. According to one aspect of the present invention, FIG. 4, illustrates the operation of a fiber optic polarization combiner/splitter. Light proceeding from waveguide 401 passes through the double refraction crystal 402 and imaging means 403 and 404, and is focused onto waveguides 405 and 406 according to polarization state. The separation of the imaging means 403 and 404 is such that parallel rays of light remain substantially parallel after passing through the imaging means independent of position in the imaging means. Preferably the imaging means are gradient index lenses of pitch less than 0.25. Preferably the waveguides 401,405 and 406 have reduced numerical aperture through mode field expansion to reduce the loss due to distortion and allow a high degree of separation of the polarization states.

Figure 5:
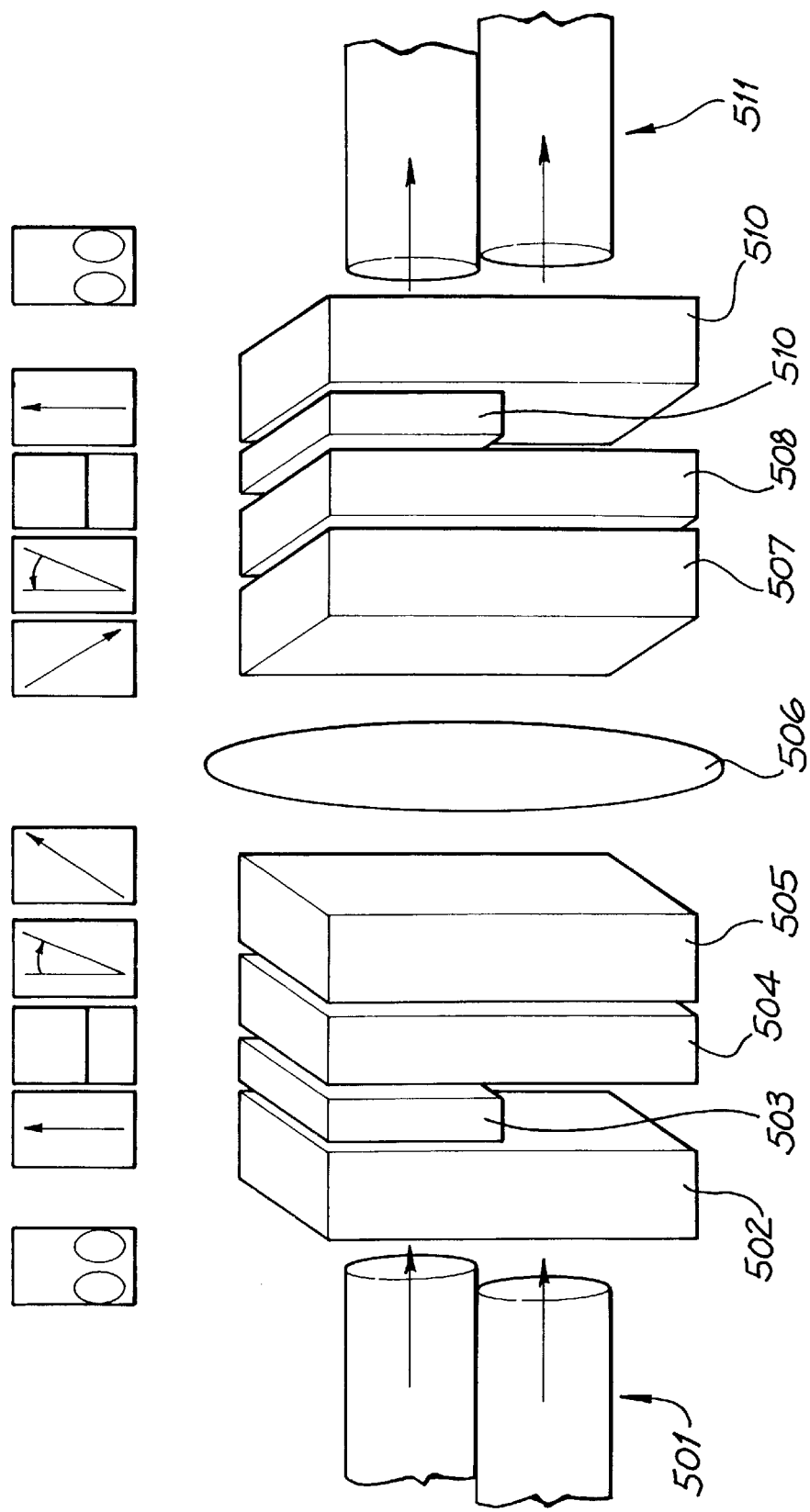
FIG. 5 illustrates a first embodiment of a four port optical circulator using double refraction crystal plates to achieve non reciprocal image displacement.

FIG. 5 illustrates the first preferred embodiment of the optical circulator according to the present invention for the example of a 4 port circulator. The extension to more or less ports is straightforward. An optical circulator, as shown in FIG. 5, is a single in-line device or assembly which includes a first array of waveguides 501, shown here are ports 1 and 3, and a second array of waveguides 511, shown here as ports 2 and 4, disposed at opposite ends of the assembly. The waveguides may be an integrated optical circuit or single mode fibers. The optical mode at the end of the pores is expanded preferably, for example thermally expanded core fiber may be employed. first through fourth double refraction crystal plates 502,505,507,510 and Faraday rotator crystals 504, 508 and half wave plate reciprocal rotator elements 503 and 508 with predetermined thickness and interval are disposed along the proceeding direction of the light in sequence 502,503,504,505,507,508,509,510. Double refraction plate 502 is orientated to give a displacement orthogonal to the axis of the waveguide array, in this case chosen to be the upward vertical direction. Double retraction crystal 509 is orientated to give a displacement in the downward vertical direction. Preferably the double refraction crystals comprise appropriately orientated plates of calcite or rutile. The reciprocal rotator elements 503 and 508 consist preferably or zero-order half wave plates with optical axis at 45 degrees to the vertical direction. The plates are positioned so that the plate intercepts substantially the light from only the upper polarization state. A well polished edge of the half wave plate is positioned approximately in the horizontal orientation, with the appropriate vertical position. The use of appropriately thermally expanded core fiber, ensures that two beams of diverging light corresponding to each polarization state are substantially separated at the end of a length of calcite or rutile of approximately 1 mm. The light in the lower diverging beam passes through air, a glass plate or quartz plate of similar thickness orientated to provide no rotation.

An imaging means 506 is disposed between the double refraction plates 505 and 507. Imaging means 506 preferably comprises a compound lens providing unity magnification and inversion for an object placed in the plane containing the end faces of the optical waveguides 501. The imaging means is constructed to allow substantially parallel rays passing through the imaging means to remain substantially parallel. This is achieved by separating the focal planes of each element of the compound lens by approximately 2 times the focal length of the lens. Some small variation from these criteria can be useful in that it permits angular tuning of the direction of the waveguides to be achieved through positioning of the waveguides with respect to the imaging means. A pair of gradient index lenses with a pitch of less than 0.25 can be used. In this case back reflection can be reduced by angling of one of the gradient index lens facets and the facet of the optical waveguide as is well understood by those skilled in the art.

Figure 6:
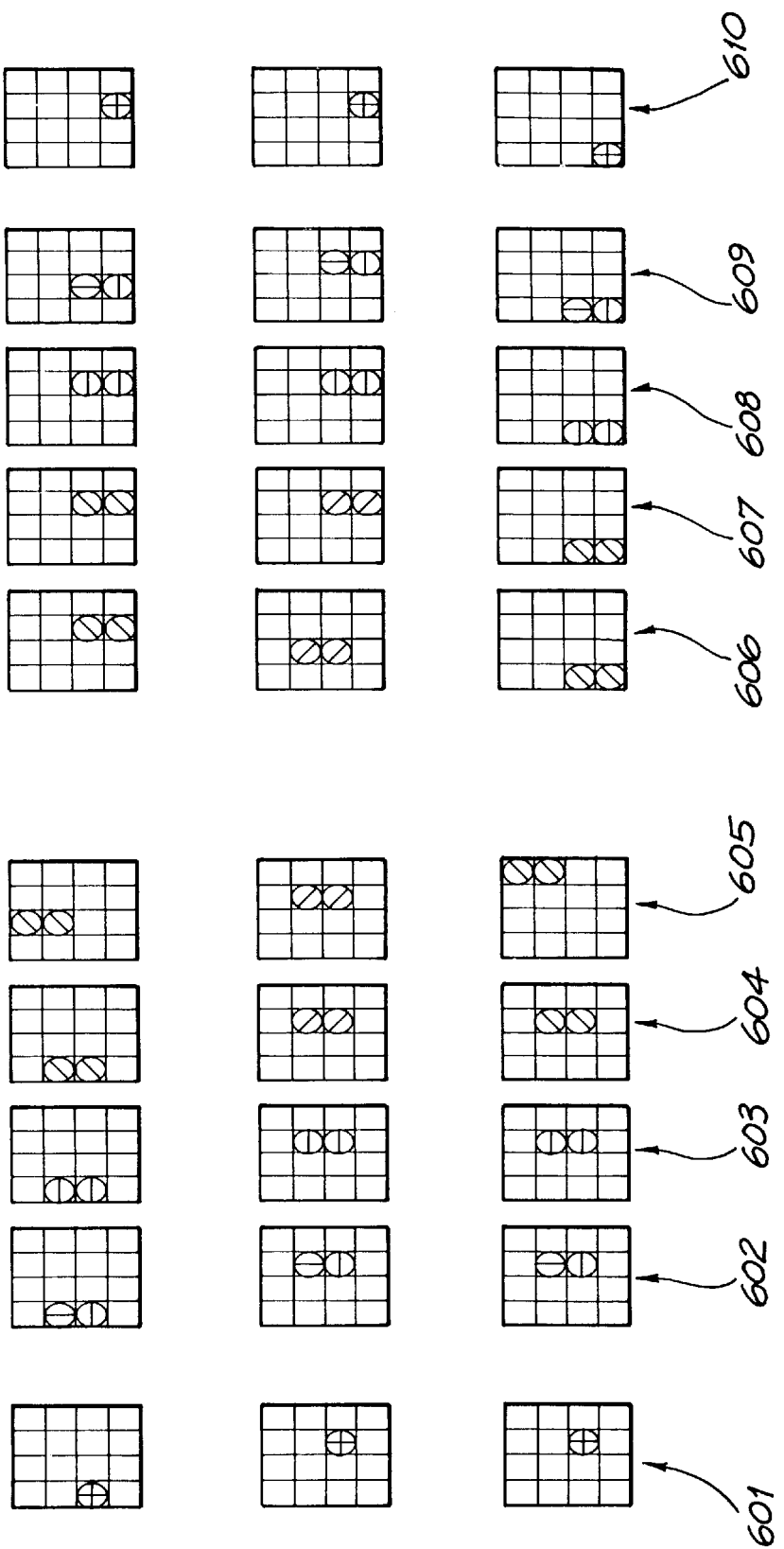
FIG. 6 illustrates the polarization states and beam displacement at various points within the first element of the invention.

The operation of the invention can be well understood with reference to the polarization diagrams of FIG. 6. At each position within the circulator of FIG. 5 there is a set of three polarization and position diagrams, 601 to 610. The top diagram in each case refers to the polarization and position of fight proceeding from port 1 of the waveguide array 501 towards port 2 of the waveguide array 511. The middle polarization and position diagram refers to the polarization and position of light proceeding from port 2 of the waveguide array 511 towards the waveguide array 501. The bottom polarization and position diagram refers to the polarization and position of light proceeding from port 3 of the waveguide array 501 towards waveguide array 511.

Studying the top row of diagrams 601 to 611 in more detail, it is noted that at the position of port 1 of waveguide array 501 there are two polarization states coincident, which can be chosen to be the vertical and horizontal polarization states represented by a horizontal and vertical Dine. The action of the first double refraction crystal 502, is to separate The divergent beams corresponding to each polarization state in the vertical direction. In this case the walk off has been chosen to be half the separation between the waveguides, but this can be quite arbitrary. The action of the half waveplate arrangement 503 is to rotate the top (vertical polarization) to the horizontal direction, so that now substantially all the light is in the one polarization state. This operation is in general only possible to achieve when the divergence of the beam proceeding from the waveguide has been reduced substantially by expanding the mode of the waveguide near the end to allow separation of the polarization states.

The action of the Faraday rotator 504 is illustrated in the top diagram of 604 where both beams have their polarization state rotated in an anti clockwise direction by preferably 45 degrees at the design wavelength. The exact degree of rotation will be wavelength dependent.

The double refraction crystal 505 provides a displacement at an angle of between 40 and 50 degrees, said angle can be chosen to produce the correct separation between the waveguides in the waveguide arrays. For the case of 45 degrees the walk off is 0.707 times the separation of the waveguides as shown in 605.

The imaging means 506 produces an inversion which for simplicity we take to be centered about the middle of the grid shown. The resultant positions are shown in 606.

The double refraction crystal 507 does not affect the position of the polarization states 607 of the now converging beans in this direction because the polarization is oriented to be the ordinary ray experiencing no displacement.

The Faraday rotator 508 provides a rotation of the polarization in a clockwise direction by preferably 45 degrees at the design wavelength as shown in 608.

The half wave plate assembly 509 rotates the top polarization to the vertical direction 609, and the two polarizations coalesce 610 at the focus due to the polarization displacement of the double refraction crystal 509.

The light is then able to be captured with low Ross by port 2 of the waveguide array 510.

The middle row of polarization diagrams illustrates how light proceeding from port 2 of the waveguide array 510, does not return to port 1 of waveguide array 501 but instead coalesces at a position where it can be captured by a third waveguide, port 3 of waveguide array 501. The non reciprocal displacement is due to the action of the non reciprocal rotators 504 and 508 and the polarization dependent displacement plates 505 and 507. The fact that the polarisations have been on both sides of this non reciprocal displacement implies that the displacement is polarization independent and the two polarisations coalesce at port 3. The top and middle diagram are identical at 608 because of the reciprocal nature of the crystals, however the action of the Faraday rotator is to oriente the polarisations such that a displacement is produced at the crystal 507 as seen in 606, and no displacement is produced by the crystal 505 as seen in 604. The action of the Faraday rotator 504 is such as to reproduce the horizontal polarization state but displaced relative to the light proceeding from port 1 as seen in 603. The light now converges to focus with the action of the elements 503 and 502 being to coalesce the polarisations, 601. The light is then able to be captured with low loss by port 3 of the waveguide array 501.

The third row of polarization diagrams 601 to 610, illustrate the polarization state and position of light proceeding from port 3 of waveguide array 501. The polarization is identical to the polarization state of light from the first port of the waveguide array 501. The only difference is the relative displacement which carries through inverted to the image at the port 4 of waveguide array 511.

According to a second preferred embodiment of the invention, it is also possible to achieve the image displacement of the two polarization images (which have been made to be identical in polarization) by using a non reciprocal beam deflector. Such deflectors can be constructed by a combination of Faraday rotators and birefringent wedges as is well discussed in the prior art. The beam deflector means placed between the lenses (Though the Faraday rotators can also be placed in the divergent beam if desired).

Figure 9:
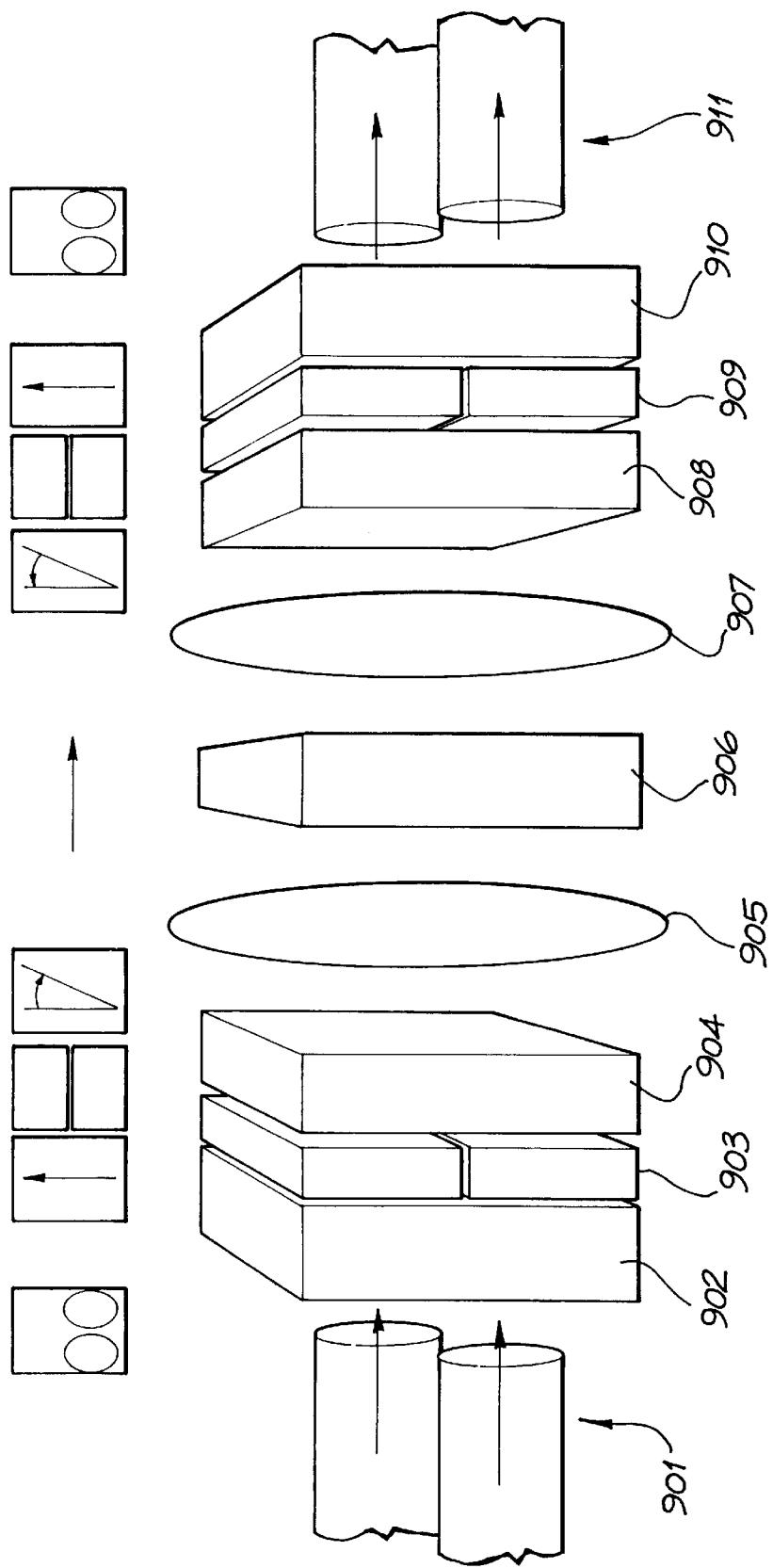
FIG. 9 illustrates an alternative arrangement utilizing a birefringent wedge.

Such an arrangement is illustrated in FIG. 9 wherein the birefringent wedge 906 is placed between the lenses 905, 907 of the imaging means. The other elements operate in the same manner as previously described with reference to FIG. 5 with the two fibres 901 being connected to double refraction plate 902, polarization equalizers 903, faraday rotator 904, lensing elements 905, 907, faraday rotator 908, reverse polarization equalizer 909, double refraction plate 910 and attached fibers 911.

According to a third preferred embodiment, a hybrid approach is adopted, whereby the polarization image separation is applied in the near field, but the polarization states are displaced relative to each other to provide circulation by walking off the entire beam. This could have advantages in allowing the straight forward extension of this technology to an arbitrary number of ports with separate optimization of each of the ports.

Figure 7:
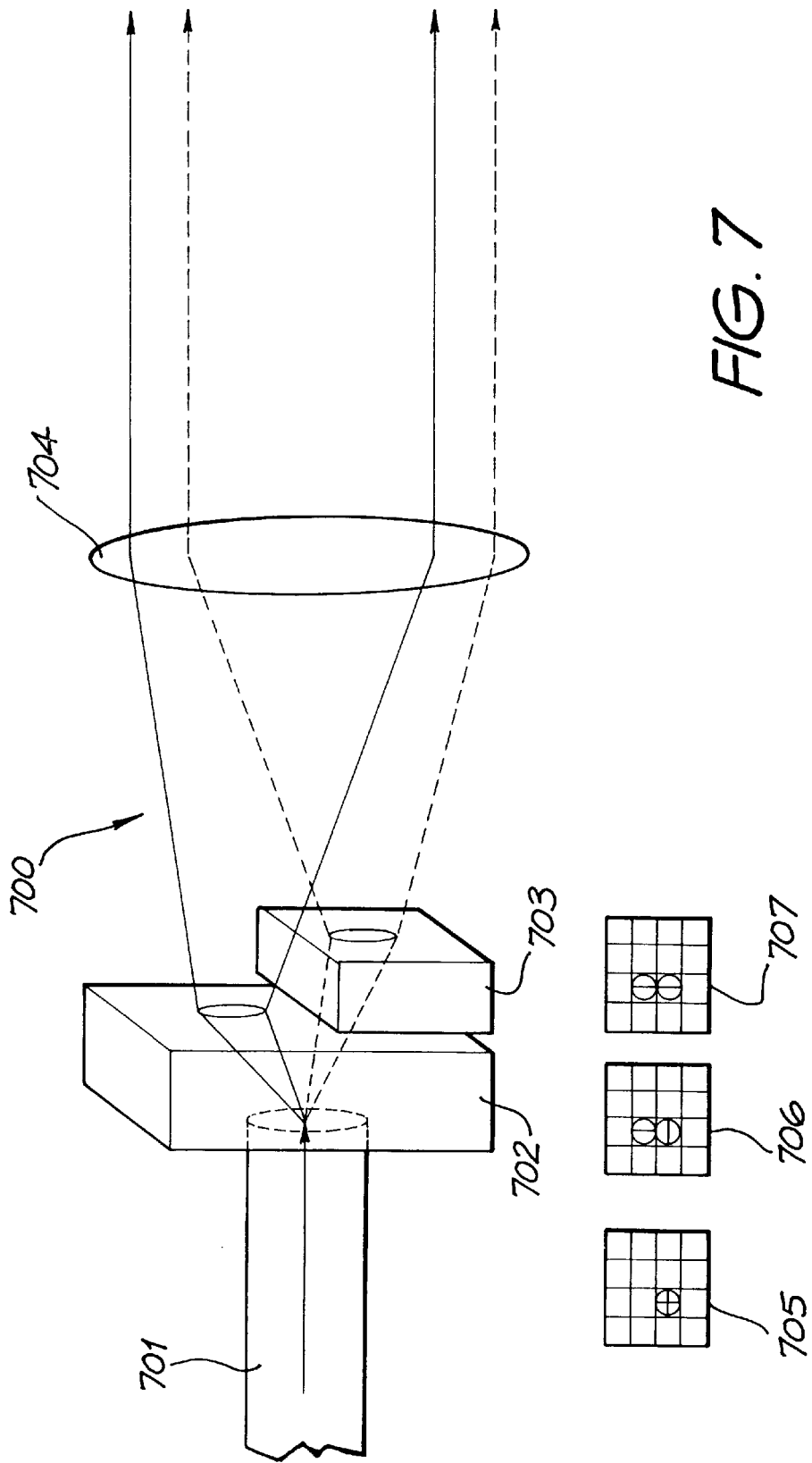
FIG. 7 illustrates a polarization equalizing collimator.

A polarization equalizing fiber beam expander 700 is produced as shown in FIG. 7. A double refraction crystal 702, polarization rotation element 703, and imaging means are disposed to intercept the light proceeding from the waveguide 701. The polarization rotation element 703 comprising preferably a zero order half waveplate with a well polished interface orientated to produce a 90 degree rotation to horizontally polarized light and is positioned to intercept the light of only one polarization proceeding from the waveguide 701, the polarization states having been split by the action of the double refraction crystal 702 into horizontal and vertical polarization states. The corresponding polarization states are shown in 705, 706 and 707. The imaging means 704 acts to substantially collimate the light of both polarization states. Preferably the fiber 701 has its mode field expanded to reduce beam divergence.

Figure 8:
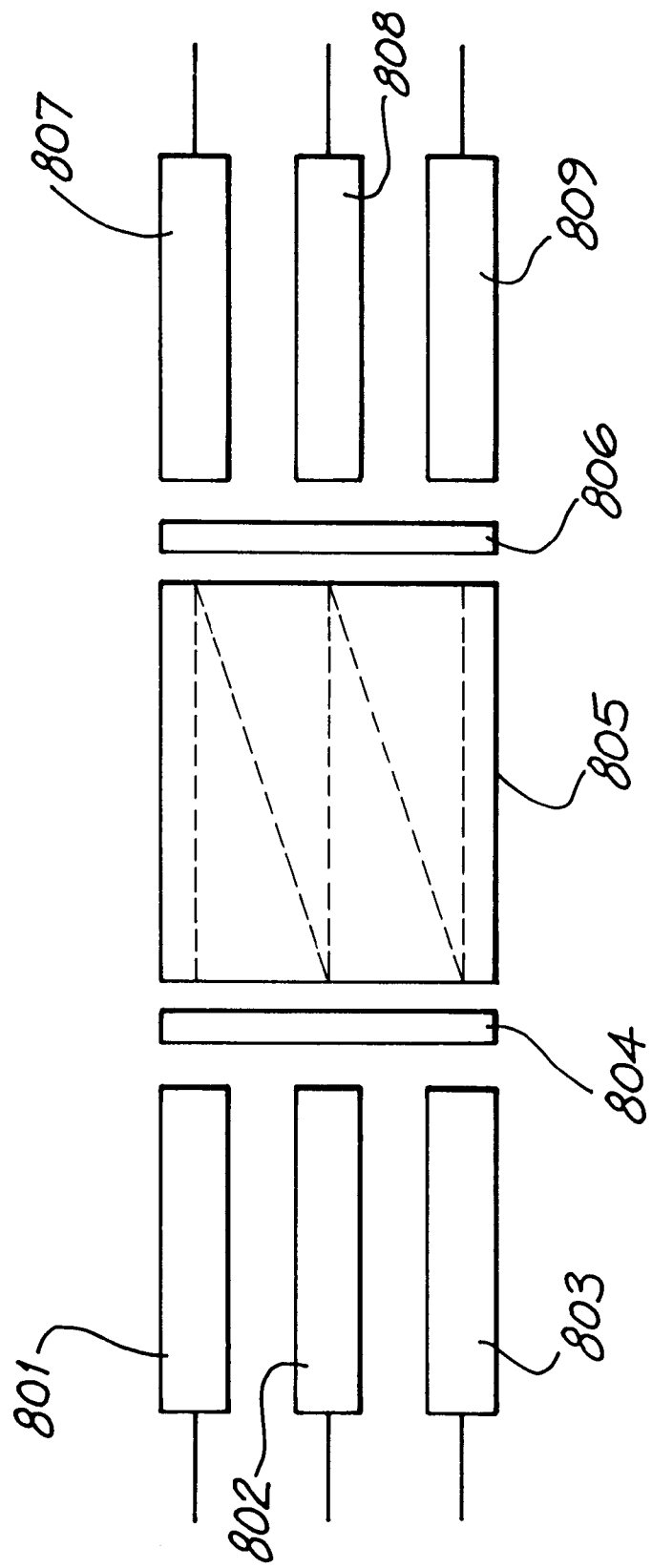
FIG. 8 illustrates a second embodiment of an optical circulator utilizing polarization equalizing collimators.

A circulator is produced as shown in FIG. 8 by using a plurality of polarization equalizing fiber beam expanders 801 802 803 807 808 809, disposed on either side of a first Faraday rotation 804 crystal providing a rotation of 45 degrees clockwise at the design wavelength; a double refraction crystal orientated to produce a walk off of the extraordinary beam at an angle of 45 degrees to the horizontal; a second Faraday rotation crystal providing a rotation of 45 degrees counterclockwise. Light proceeding from the fiber of 801 is captured by the fiber of 807 which is positioned so as to optimize the light throughput. The light proceeding from the fiber of 807 does not return, but instead is walked off by the crystal 805, as the polarization is now the extraordinary beam. In this fashion an arbitrary number of ports 808,803 809 etc. can be added in a sequential fashion, as light proceeding from the left to right will proceed as the ordinary beam and light proceeding from right to left will proceed as the extraordinary beam.

There are clearly a large number of possible configurations and variations that can be used which utilize the basic concept of this invention to achieve circulation. It is also possible to produce magnetic switches and polarization splitting and combining devices in exactly the same way. There are also advantages in applying this concept to isolators in allowing the production of high isolation isolators using multiple stages. Such applications would be apparent to one skilled in the art.

Further, in the aforementioned arrangements, the thickness of the walkoff plates, e.g. 502 of FIG. 5, can be between 0.5 mm and 2 mm. Further, the optical fibers, e.g. 501 of FIG. 5, can be separated by between 100 and 200 microns. Further, as illustrated in FIG. 5, low losses can be provided by provision of a substantially equal optical path length between the first array of waveguides and the imaging means and the second array of waveguides and the imaging means.

I claim:

1. A non reciprocal optical device for transmitting light in a forward and reverse direction substantially independently of polarization state from a collection of waveguides comprising:

a first array of spaced apart waveguides comprising at least a first wave guide and a second waveguide;

a second array of spaced apart waveguides comprising at least a third waveguide;

imaging means for focusing a diverging beam of light disposed between said first array and said second array of waveguides;

at least two polarization equalization means for polarization equalization of diverging or converging light, each of said polarization equalization means disposed between a waveguide array and said imaging means; and a plurality of polarization rotation means disposed between each waveguide array;

wherein light from said first waveguide is transmitted to said third waveguide and light from said third waveguide is transmitted to said second waveguide in a polarization independent manner and further wherein said polarization equalization means and said imaging means are disposed with respect to one another and with respect to the respective first, second and third waveguides such that light radiating from each of the first, second and third waveguides first passes through one of the at least two polarization equalization means prior to passing through said imaging means which is located between said polarization equalization means.

2. An optical device according to claim 1 wherein:

said first and second array of spaced apart waveguides are arranged with orientation in a principle axis;

a first said polarization equalization means includes:

a first polarization dependent displacement means which provides a polarization dependent displacement in an orthogonal direction; and first polarization component equalization means is provided for substantially equalizing the polarization state of light propagating from said first array of waveguides, said polarization component equalization means being disposed between first polarization dependent displacement means and said imaging means;

a second of said polarization equalization means includes:

a second polarization dependent displacement means which provides a displacement in a direction orthogonal to the principle axis direction; and second polarization component equalization means is provided for substantially equalizing the polarization state of light propagating from said second array of waveguides, said second polarization component equalization means disposed between said second polarization dependent displacement means and imaging means;

a first polarization rotation means which comprises a substantially 45 degree Faraday rotator which is disposed between said first polarization equalization means and said imaging means;

a second polarization rotation means which comprises a substantially 45 degree Faraday rotator disposed between second means for polarization equalization and imaging means; and a third polarization dependent displacement means is provided disposed between said first polarization rotation means and second polarization rotation means.

3. An optical device according to claim 2, wherein said first polarization dependent displacement means is provided by a first birefringent crystal plate and said second polarization dependent displacement means is provided by a second birefringent crystal plate, of similar thickness to the first plate.

4. An optical device according to claim 3, wherein said birefringent crystal plates comprises rutile or calcite with optical axis orientated so as to provide walk off of one polarization state with respect to the second and with thickness of between 0.5 mm and 2 mm.

5. An optical device according to claim 2, wherein said third polarization dependent displacement means includes birefringent plates of substantially equal thickness disposed on either side of imaging means, orientated at approximately 45 degrees to the principle axis, and substantially orthogonal to each other.

6. An optical device according to claim 2, wherein said third polarization dependent displacement means includes at least one wedge of birefringent crystal disposed within the imaging means.

7. An optical device according to claim 1, wherein each of said polarization equalization means is provided means for equalization of polarization state utilizing a half waveplate with orientation of axis at 45 degrees to the polarization states and is positioned as to allow light of substantially only one polarization to pass through the half wave plate.

8. An optical device according to claim 1, wherein each of said polarization equalization means for equalization of polarization state includes a composite of Faraday rotating crystals providing substantially 45 degrees rotation of the polarization state such that the direction of rotation is opposite between a top and bottom rotating crustal, positioned so as to allow an opposite rotation of the principle axis and orthogonal to principle axis polarization states.

9. An optical device according to claim 1, wherein the first and second array of optical waveguides comprise single mode optical fibers preferably with cores separated by between 100 and 200 microns.

10. An optical device according to claim 1, wherein waveguide enlargement means is provided to reduce the divergence of the light proceeding from optical waveguides.

11. An optical device according to claim 10, wherein said waveguide enlargement means is provided by thermal expansion of the core of the waveguide to increase the modal size of the waveguide.

12. An optical device according to claim 1, wherein said imaging means provides a simple inversion with no significant enlargement and parallel rays of light are maintained substantially parallel.

13. An optical device according to claim 1, wherein said imaging means is provide by two gradient index lenses of pitch less than 0.25, axially aligned and separated by a distance sufficient to provide substantially parallel rays to pass through lens arrangement remaining substantially parallel.

14. An optical device according to claim 1, wherein low polarization mode dispersion is provided by provision of equal path lengths of each polarization state in both directions.

15. An optical device according to claim 1, wherein low loss is provided by provision of a substantially equal optical path length between the first array of waveguides and the imaging means and the second array of waveguides and the imaging means.

16. An optical device according to claim 1, wherein the first array of waveguides and the second array of waveguides are substantially parallel and axially aligned.

17. An optical device according to claim 1, wherein the first array of waveguides and the second array of waveguides are disposed on the same side of the imaging means and a reflection means is provided to allow imaging of the first array of waveguides to the second array of waveguides.

18. A non reciprocal optical device for transmitting light in a forward and reverse direction substantially independently of polarization state from a collection of waveguides comprising:

a first array of spaced apart waveguides comprising at least a first wave guide and a second waveguide;

a second array of waveguides comprising at least a third waveguide;

imaging means for focusing a diverging beam of light disposed between said first array and said second array of waveguides;

a plurality of polarization rotation means disposed between each waveguide array including a first polarization rotation means disposed between said first waveguide and said imaging means and a second polarization rotation means disposed between said imaging means and said third waveguide; and at least one waveguide enlargement means which is provided to reduce the divergence of the light proceeding from said optical waveguides, wherein light from said first waveguide is transmitted to said third waveguide and light from said third waveguide is transmitted to said second waveguide in a polarization independent manner.

19. An optical device according to claim 18, wherein said waveguide enlargement is provided by thermal expansion of the core of the waveguide to increase the modal size of the waveguide.

20. An optical device comprising:

a first waveguide;

a second waveguide;

imaging means disposed in an optical path of the first and second waveguides; a first optical element disposed in said optical path between the first waveguide and the imaging means;

and a second optical element disposed in said optical path between the imaging means and the second waveguide, wherein said first optical element has at least a polarization dependent displacement component for splitting a light beam traveling in a forward direction from the first waveguide towards the second waveguide into two orthogonally polarized beam components and an optical rotation component which cause the planes of the polarized beam components to be equalized; and the second optical element has at least a polarization dependent displacement means for splitting a light beam traveling in a reverse direction from the second waveguide towards the first waveguide into two orthogonally polarized beam components and an optical rotation component which causes the planes of the polarized beam components to be equalized; the arrangement being such that a light beam from the first waveguide is coupled into the second waveguide but a light beam from the second waveguide is disposed away from the first waveguide, and further wherein said optical element, said second optical element and said imaging means are disposed with respect to one another and with respect to the respective first and second waveguides such that light radiating from each of the first and second waveguides first passes through one of the first or second optical elements prior to passing through said imaging means which is located between said first and second optical elements.

21. An optical device as claimed in claim 20, wherein the optical rotation component of the first optical element is positioned so as to intercept only one of the two orthogonally polarized beam components traveling in a forward direction from the polarization dependent displacement means of said first optical element.

22. An optical device as claimed in claim 20, wherein the components of the first and second optical elements are arranged in a symmetrical manner on respective sides of the imaging means such that the path lengths for each polarization state in each direction of propagation are substantially equal.

23. An optical device as claimed in claim 20, further comprising a first array of spaced apart waveguides comprising said first waveguide and a third waveguide, wherein a light beam from the second waveguide displaced away from the first waveguide is displaced to said third waveguide.

24. An optical device comprising:

a first waveguide;

a second waveguide;

imaging means disposed in an optical path of the first and second waveguides;

a first non-reciprocal optical element comprising a plurality of optical components disposed in said optical path between the first waveguide and the imaging means;

and a second non-reciprocal optical element comprising a plurality of optical components disposed in said optical path between the imaging means and the second waveguide, wherein each of said optical elements includes a polarization dependent displacement component for splitting a light beam into two orthogonally polarized beam components and an optical rotation component for equalizing the planes of said beam components, and the optical components of said optical elements are arranged such that said optical elements act together to firstly split and then recombine a light beam but wherein each of said optical elements by itself is unable to split and recombine a light beam, and further wherein said first non-reciprocal optical element, said second non-reciprocal optical element and said imaging means are disposed with respect to one another and with respect to the respective first and second waveguides such that light radiating from each of the first and second waveguides first passes through one of the first or second non-reciprocal optical elements prior to passing through said imaging means which is located between said first and second non-reciprocal optical elements.

25. An optical device comprising:

a first array of spaced apart waveguides comprising at least a first waveguide and a third waveguide;

a second array of spaced apart waveguides comprising at least a second waveguide;

imaging means disposed in an optical path of the first and second waveguides;

a first non-reciprocal optical element comprising a plurality of optical components disposed in said optical path between the first waveguide and the imaging means;

and a second non-reciprocal optical element comprising a plurality of optical components disposed in said optical path between the imaging means and the second waveguide, wherein each of said optical elements includes a polarization dependent displacement component and an optical rotation, and the optical components of said optical elements are arranged such that said optical elements act together to firstly split and then recombine light beams such that light from said first waveguide is transmitted to said second waveguide and light from said second waveguide is transmitted to said third waveguide but wherein each of said optical elements by itself is unable to split and recombine a light beam, and further wherein said first non-reciprocal optical element, said second non-reciprocal optical element and said imaging means are disposed with respect to one another and with respect to the respective first, second and third waveguides such that light radiating from each of the first, second and third waveguides first passes through one of the first or second non-reciprocal optical elements prior to passing through said imaging means which is located between said first and second non-reciprocal optical elements.

26. An optical device as claimed in claim 25, wherein the components of the first and second optical elements are arranged in a symmetrical manner on respective sides of the imaging means such that the path lengths for each polarization state in each direction of propagation are substantially equal.

* * * * *